United States Patent
Martin

[15] 3,669,239
[45] June 13, 1972

[54] METHOD AND MEANS FOR UNLOADING ARTICLES FROM A CONVEYOR

[72] Inventor: Walter Harper Martin, San Antonio, Tex.
[73] Assignee: Refrigeration Engineering Corporation, San Antonio, Tex.
[22] Filed: Jan. 13, 1971
[21] Appl. No.: 106,173

[52] U.S. Cl. ................................................ 198/25, 198/185
[51] Int. Cl. ................................. B65g 47/00, B65g 15/00
[58] Field of Search .............. 198/33 A A, 25, 230, 229, 103, 198/185

[56] References Cited

UNITED STATES PATENTS

| 1,550,365 | 8/1925 | Jones | 198/229 |
| 3,087,599 | 4/1963 | Nelson | 198/127 R |
| 2,103,920 | 12/1937 | Guba | 198/194 |

Primary Examiner—Richard E. Aegerter
Attorney—Watson, Cole, Grindle & Watson

[57] ABSTRACT

Means for unloading articles from a grid-type conveyor unit comprising a rotary brush mounted for free-wheeling rotation about an axis lying transverse to the longitudinal movement of the conveyor and being positioned on the conveyor unit below its grid and intermediate its ends, the rotary brush serving to push the products off the grid-type conveyor unit as its bristles project therethrough.

5 Claims, 4 Drawing Figures

METHOD AND MEANS FOR UNLOADING ARTICLES FROM A CONVEYOR This invention relates generally to an article-conveying apparatus and more particularly to a means for smoothly and effectively unloading articles from a conveyor.

In the product-conveying art wherein grid-like or wire screens are made use of for the transferring of products resting thereon from one station to another, the difficulty in smoothly and effectively transferring the products from the grid has given rise to any number of designs. Among these include individual lifting means or simply a flat plate means located at one end of a conveyor so as to effect a transfer therefrom on to either a worktable or another conveyor. Neither of these approaches has proved altogether satisfactory since costly and space-consuming equipment is normally required to conveniently carry out such a transfer. Moreover, such lifting means heretofore devised must generally be precisely synchronized with the location of each product on the grid and/or with the grid structure itself. For example, known lifting means for the purpose above stated has included the use of a series of spaced assembled disks designed to accommodate the grid bars, the disks being each provided with an aligned peripheral groove for the lifting of products from a grid conveyor at the end of its run. However, the rotation of such a disk assembly is needed to be perfectly synchronized with movement of the grid so that any interference with transverse portions of the grid structure is avoided. Also, another of such lifting means is designed for precise contact with each product carefully spaced on the conveyor so that one of a number of radially spaced lifting pads may lift each product successively from the conveyor as the pads rotate about a common axis. The drawbacks inherent with the use of such devices are normally that some synchronization or indexing must always be maintained between the lifting means and the conveyor belt from which the articles are to be unloaded or transferred. It is therefore a principal object of the present invention to provide a means for unloading or transferring such products which is simple, easy to install, economical and highly effective without the need for additional or independently operating equipment.

Another object of the present invention is to provide such an unloading or transfer means for products from a conveyor which is freely rotatably simply by means of the grid conveyor passing thereover.

A further object of this invention is to provide such a transfer means which includes the use of a brush having a plurality of elongated, radially extending, stiff bristles, a portion of which simply project through the bottom of the grid so as to thereby lift the products therefrom for unloading or for transferring them to another station.

A still further object of the invention is to provide such a transfer means wherein the brush is disposed intermediate ends of the grid-like conveyor unit so as to avoid any undue wear or crushing of the bristles as the grid passes thereover.

A still further object of the present invention is to provide such a transfer means wherein the articles are transferred to a roller conveyor.

Other objects, advantages and novel features of the invention will become apparent from the following detailed description of the invention when considered in conjunction with the accompanying drawings wherein.

Figure 1:
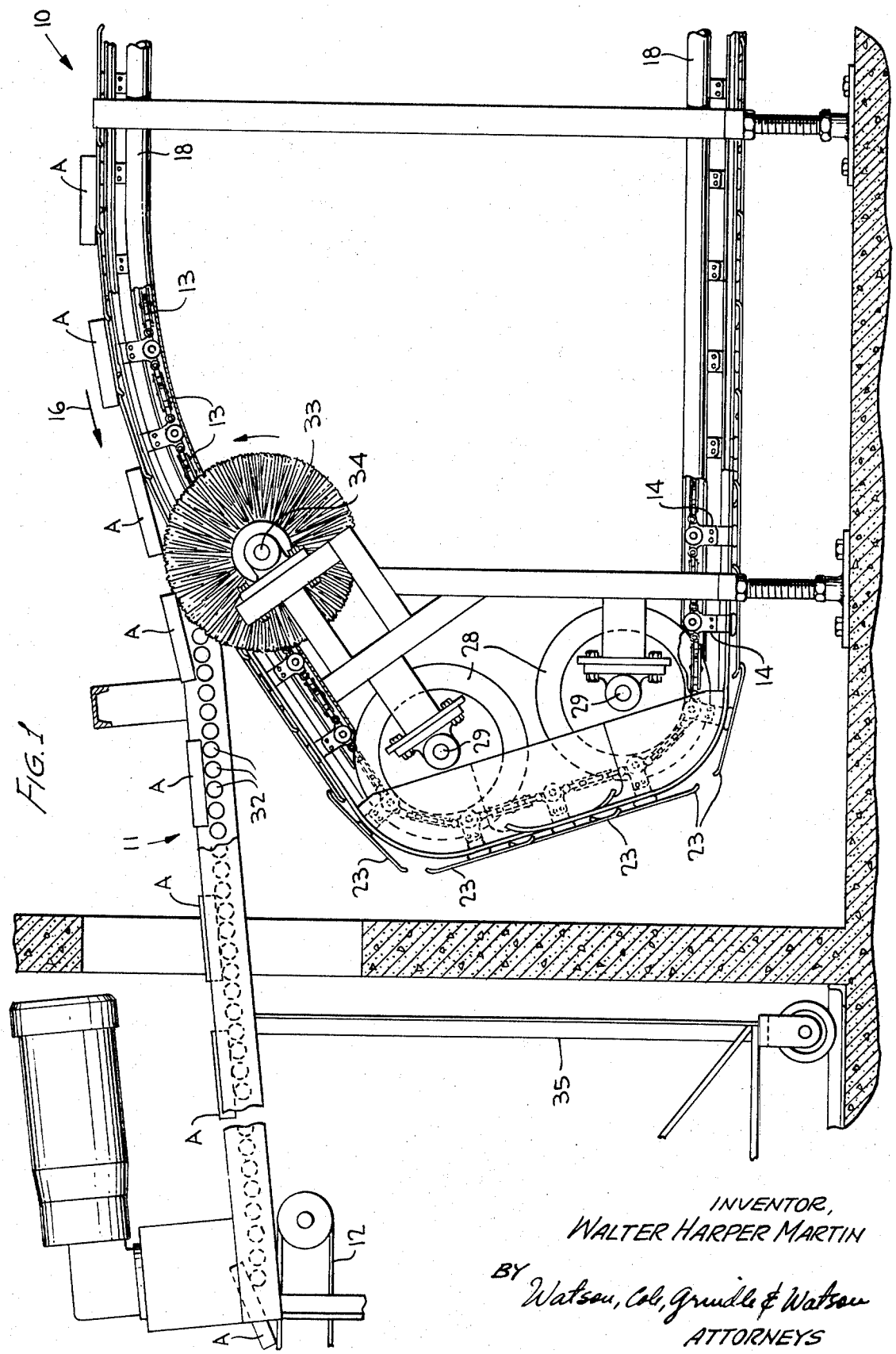
FIG. 1 is an elevational side view showing a portion of the conveying apparatus according to the present invention with its inventive transfer and unloading means.

Turning now to the drawings wherein like reference characters refer to like and corresponding parts throughout the several views, there is shown in FIG. 1 a side elevational view of a grid-like conveyor unit 10 and a roller conveyor unit 11 for the conveying of articles A on to a conventional band conveyor unit 12. It should be noted that the grid-like conveyor 10 is only partially shown for the sake of clarity, the opposite end thereof which is not depicted being substantially the same as that which is shown.

Figure 3:
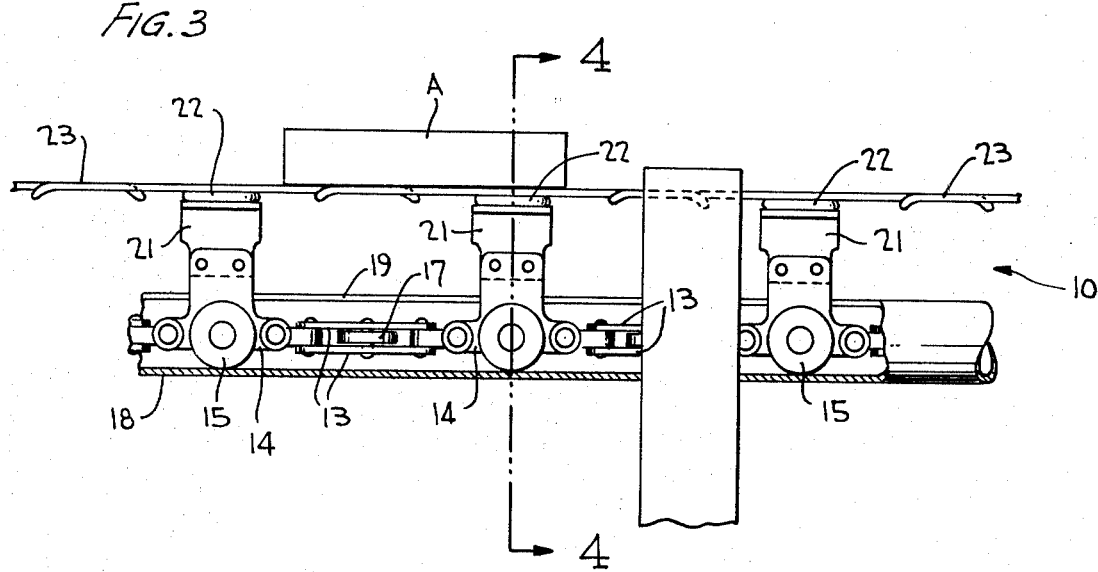
FIG. 3 is a partial elevational side view showing the manner in which the rid conveyor is arranged for movement in a tube shown partly broken away.
Figure 4:
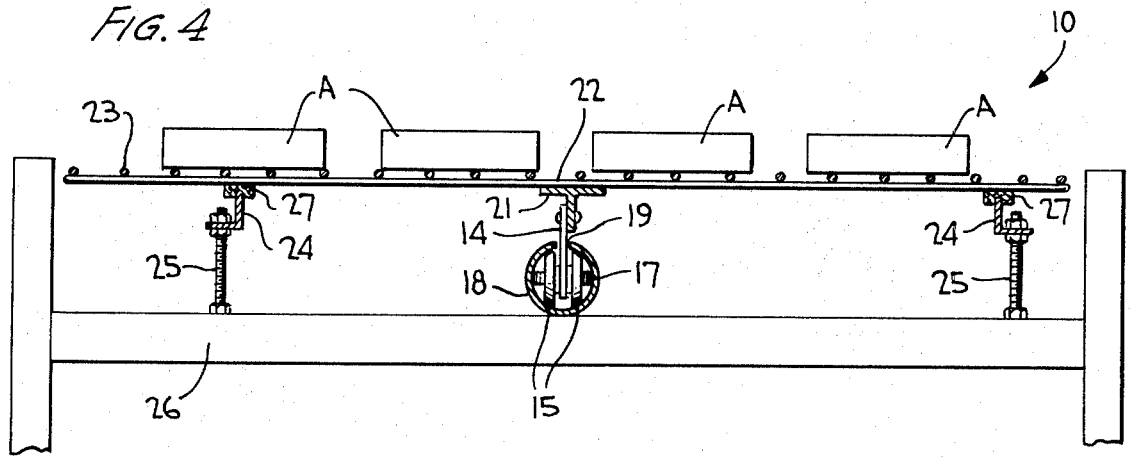
FIG. 4 is a transverse elevational view of the grid conveyor taken substantially along the line 4—4 of FIG. 3.

Conveyor unit 10 comprises substantially a number of chain links 13 interconnected by means of conveyor supports 14 (seen clearly in FIG. 3), near the bottoms of each being provided with a pair of rollers 15, as seen most clearly in FIG. 4 of the drawings. These rollers are mounted in any conventional manner for movement about an axis transverse to the direction 16 of conveyor 10 travel. Also, a roller 17 is mounted between a pair of links 13 for movement about a vertical axis and, together with the rollers 15, are disposed within an elongated tube 18 having a longitudinal slot 19 therein thereby permitting the top portions of each grid support 14 to project outwardly thereof. As seen in FIG. 4, the tube 18 is disposed substantially along the center line of the conveyor unit 10, the grid portion of which being secured to the tops of supports 14 by means of T-bar sections 21. One of such T-bars is provide for each of the grid supports and a substantially close-looped transverse grid rod 22 is suitably secured, as by welding, to the base of each T-bar section. Also, a substantially sinuous or zig-zag shaped grid bar 23 is conveniently secured, as by welding, outwardly along the length of each transverse rod 22 so that, together, the zig-zag bars 23 provide a continuous grid or screen, shown in FIG. 2, for supporting a plurality of articles A.

In order to stabilize each grid section 22,23 throughout their movement during transfer, an elongated bar 24, shown L-shaped in cross-section, is disposed parallel to tube 18 along opposite sides thereof at a sufficient distance near the side of the grid.

Each of these bars is conveniently mounted by means of a threaded stud member 25 secured to support 26 of the conveyor disposed parallel to grid rods 22 inwardly thereof. The outer portion of each bar 24 is provided with a pad 27 of felt or similar material so as to take up the frictional wear between the grid sections and the L-shaped bars.

The combined chain links and supports 14 form an endless conveyor which is entrained about a pair of rollers 28 each mounted for rotation in a convenient manner about an axle 29 disposed substantially parallel to the rods 22. It should be understood that a like pair of rollers 28 are also provided at the opposite end of the first conveyor which has not been shown for the sake of clarity.

Figure 2:
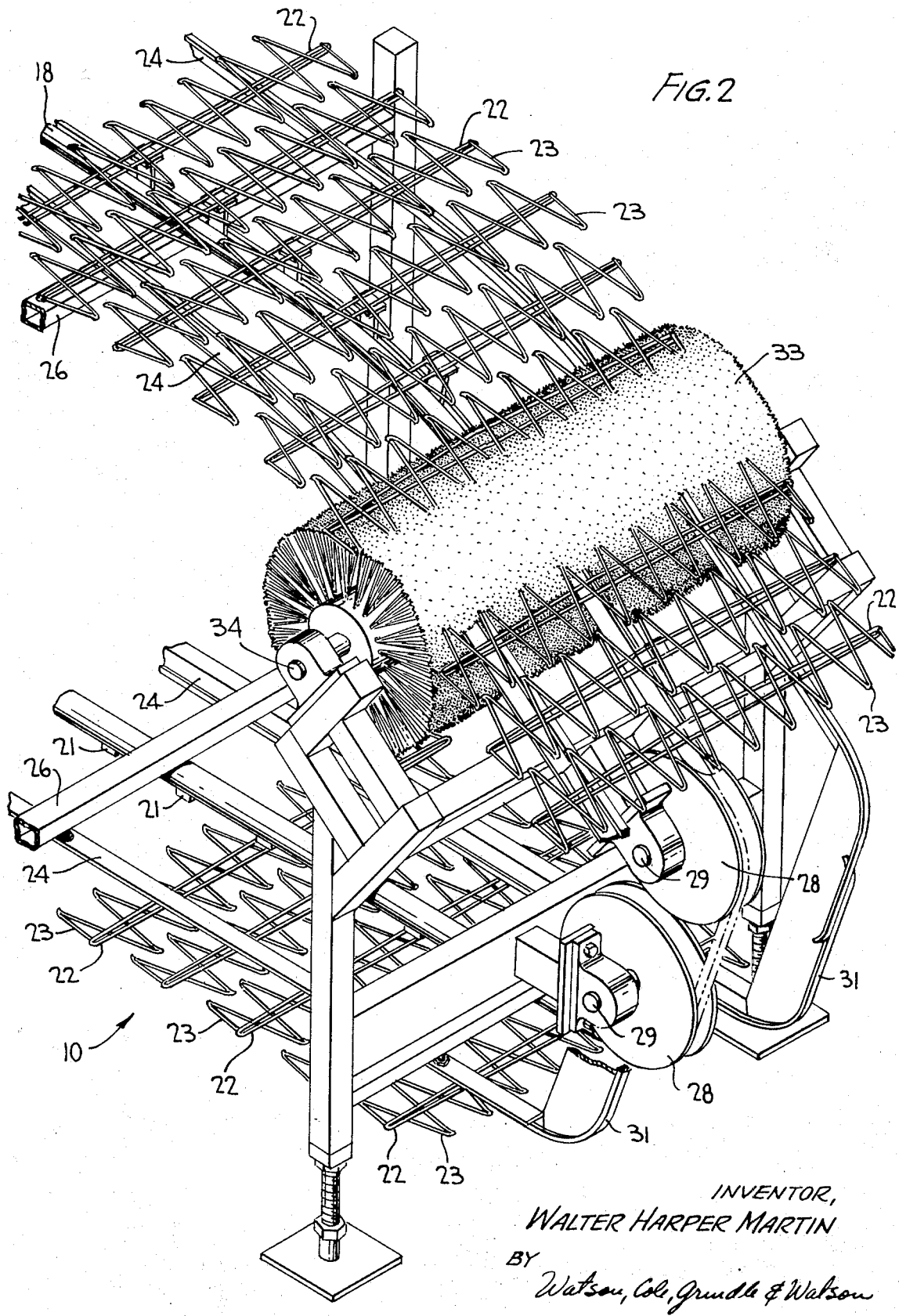
FIG. 2 is a perspective showing of the grid conveyor in relation to the rotary transfer brush in accordance with the present invention.

Also, it should be pointed out that the upper and lower L-shaped rods 24, as seen in FIG. 2, are respectively joined by means of curved rails 31 in the vicinity of rollers 28 at opposite ends of the conveyor 10 unit.

The grid means are moved in a direction as shown by arrow 16 by any conventional motor means, not shown in the the drawings, so that the articles A may be moved toward another conveyor 11 shown as substantially comprising a conventional gravity roll conveyor having a plurality of parallel-related rollers 32.

The means for effecting a smooth and continuous unloading of the products A from conveyor 10 comprises a rotary brush 33 which is mounted for rotation about an axle 34 parallel to axles 29. As can be seen, the rotary brush is provided with a plurality of radially disposed bristles of such a thickness depending on the type and size of article A to be transferred. It can be also seen that the rotary brush is mounted sufficiently near the grid sections 22,23 so that a portion of the bristles are made to project entirely therethrough, as seen in FIGS. 1 and 2, from beneath the grid. Also, the rotary brush is mounted for rotation intermediate the ends of conveyor unit 10 so as to effectively avoid the problem of undue bristle wear which has been found to occur should the rotary brush be disposed at the end of the grid conveyor.

In other words, if the rotary brush were located at such end it would undergo severe bristle crushing by the conveyor grid sections 22,23 during their turning motion about the uppermost roller 28. Therefore, with the brush disposed in the vicinity of a substantially straight run of the grid sections, the bristles cleanly project upwardly therethrough so as not to be crushed during turning movement of the grid sections.

The rotary brush 33 is mounted for free-wheeling rotation about its axis so that no independent means is required for rotating thereof. Instead, the brush is rotated as the grid sections, 22,23 successively contact the brush bristles in its movement from right to left, seen in FIG. 1. As the brush turns in a counterclockwise direction, shown by the curved arrow, each of the articles A are successively lifted slightly off the grid of conveyor unit 10 and are thereafter transferred on to the rollers 32 of the second conveyor 11 with continued rotation of the brush. In this way, no synchronization or indexing between either the brush and the articles conveyed or between the brush and the grid structure of conveyor 10 is required. The bristles of the brush may be of any natural or synthetic composition and are sufficiently flexible so that they may always protrude through grids 22,23 and around tube 18 and the L-shaped bars 27. Each of the articles A will therefore be gently and easily transferred from the first to the second conveyor as described above.

From the drawings it can also be seen that the ends of each adjacent zig-zag rod 23 slightly overlap during their movement along a substantially straight plane so as to avoid any tendency for the articles A to fall therethrough. Also, it should be noted that the second conveyor 11 is portably supported by means of a roller structure 35 although some other arrangement is possible without departing from the spirit of the invention. For example, the conveyor unit 11 may be replaced by a work table or other such means.

Obviously, many modifications and variations of the present invention are possible in the light of the above teachings. It is therefore to be understood that within the scope of the appended claims, the invention may be practiced otherwise than as specifically described.

What is claimed is:

1. In a conveyor unit having movable perforate grid means, a means for unloading articles from said conveyor unit which rest on said grid means, comprising a brush means for freely mounting said brush a predetermined distance below said grid means for free wheeling rotation about an axis transverse to the direction of movement of said grid means, said brush having a plurality of bristles of a length greater than said predetermined distance so as to project upwardly through the perforations of said grid means whereby, upon rotation of said brush solely by said grid means passing thereover and in contact with said bristles, each of the articles lying on said grid means in the vicinity of said brush is pushed upwardly by said bristles projecting upwardly therethrough and off said grid means to be thereby unloaded from said conveyor unit.

2. In the conveyor unit according to claim 1 wherein said bristles are substantially stiff, elongated and radially extending.

3. In the conveyor unit according to claim 2 wherein said grid means are mounted for endless movement about roller means located at opposite ends thereof, said brush being located intermediate aid roller means.

4. In the conveyor unit according to claim 1 wherein said grid means comprise a plurality of grid sections each comprising a sinuous-type rod secured along the length of a transverse rod.

5. In the conveyor unit according to claim 4 wherein the articles are unloaded on to another conveyor unit, one end of which is disposed adjacent said rotary brush.

* * * * *